United States Patent
Sakakibara et al.

(10) Patent No.: US 7,682,590 B2
(45) Date of Patent: Mar. 23, 2010

(54) CARBON NANOTUBE DISPERSED POLAR ORGANIC SOLVENT AND METHOD FOR PRODUCING THE SAME

(75) Inventors: Youichi Sakakibara, Tsukuba (JP); Madoka Tokumoto, Tsukuba (JP); Oleksiy Rozhin, Tsukuba (JP); Hiromichi Kataura, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 91 days.

(21) Appl. No.: 10/580,809

(22) PCT Filed: Nov. 16, 2004

(86) PCT No.: PCT/JP2004/017332
§ 371 (c)(1),
(2), (4) Date: Feb. 16, 2007

(87) PCT Pub. No.: WO2005/052053
PCT Pub. Date: Jun. 9, 2005

(65) Prior Publication Data
US 2007/0224106 A1    Sep. 27, 2007

(30) Foreign Application Priority Data
Nov. 27, 2003 (JP) .............................. 2003-397082
Dec. 2, 2003 (JP) .............................. 2003-403504

(51) Int. Cl.
*D01F 9/12* (2006.01)
*C08L 39/06* (2006.01)
*B82B 1/00* (2006.01)

(52) U.S. Cl. ..................................... 423/447.1; 516/32

(58) Field of Classification Search ...................... None
See application file for complete search history.

(56) References Cited

U.S. PATENT DOCUMENTS

| 6,194,119 | B1* | 2/2001 | Wolk et al. | 430/200 |
| 7,365,100 | B2* | 4/2008 | Kuper et al. | 516/32 |
| 2002/0046872 | A1* | 4/2002 | Smalley et al. | 174/137 A |
| 2003/0012723 | A1* | 1/2003 | Clarke | 423/460 |
| 2003/0122111 | A1* | 7/2003 | Glatkowski | 252/500 |
| 2004/0038251 | A1* | 2/2004 | Smalley et al. | 435/6 |
| 2005/0025694 | A1* | 2/2005 | Zhang et al. | 423/447.1 |

FOREIGN PATENT DOCUMENTS

| JP | 2000-072422 | 3/2000 |
| JP | 2000-86219 | 3/2000 |
| JP | 2003-292801 | 10/2003 |
| JP | 2003-397082 | 11/2003 |
| JP | 2004-167667 | 6/2004 |
| JP | 2004-216516 | 8/2004 |
| JP | 2004-352608 | 12/2004 |
| JP | 2005-075661 A | 3/2005 |
| JP | 2005-154630 | 6/2005 |
| JP | 2005-162877 | 6/2005 |
| WO | WO 02/016257 A3 | 2/2002 |

OTHER PUBLICATIONS

S. Cui et al., "Characterization of multiwall carbon nanotubes and influence of surfactant in the nanocomposite processing," Carbon, 41 ed., Elsevier Science Ltd., p. 797-809, (2003).
Michael J. O'Connel et al., "Band Gap Fluorescence from Individual single-Walled Carbon Nanotubes," Science, p. 593-596, (Jul. 26, 2002).
Michael J. O'Connel et al., "Reversible water-solubilization of single-walled carbon nanotubes by polymer wrapping," Chemical Physics Letters, Elsevier Science B.V., p. 265-271, (Jul. 13, 2001).
Kevin D. Ausman, et al., "Organic Solvent Dispersions of Single-Walled Carbon Nanotubes: Toward Solutions of Pristine Nanotubes," The Journal of Physical Chemistry, American Chemical Society, (vol. 104), (Issue. 38), (p. 8911-8915), (2000).

* cited by examiner

*Primary Examiner*—Jerry Lorengo
*Assistant Examiner*—Yun Qian
(74) *Attorney, Agent, or Firm*—Hammer & Associates, P.C.

(57) ABSTRACT

In the present invention, a nonionic surfactant is noticed for a function of dispersing a carbon nanotube, and it is found that a mixture solution of an amide-based organic solvent and a polyvinylpyrrolidone (PVP) or of the amide-based organic solvent, the nonionic surfactant, and the polyvinylpyrrolidone (PVP) has an excellent function as a dispersant for the carbon nanotube. Ultrasonication is required for dispersing a carbon nanotube in the dispersant. The ultrasonication may be carried out in the step of dispersing the carbon nanotube in the nonionic surfactant and/or the amide-based polar organic solvent, and then the polyvinylpyrrolidone (PVP) may be mixed with the resultant dispersion. Alternatively, a mixture solution of the nonionic surfactant and/or the amide-based polar organic solvent, and the polyvinylpyrrolidone (PVP) is prepared, and then the ultrasonication may be carried out in the step of dispersing the carbon nanotube therein.

19 Claims, No Drawings

CARBON NANOTUBE DISPERSED POLAR ORGANIC SOLVENT AND METHOD FOR PRODUCING THE SAME

TECHNICAL FIELD

The present invention relates to a carbon nanotube dispersion liquid containing an amide-based organic solvent and a polyvinylpyrrolidone (PVP), a carbon nanotube dispersion liquid containing an amide-based organic solvent, a nonionic surfactant, and a polyvinylpyrrolidone (PVP), and a method for producing the same. The invention particularly relates to a carbon nanotube dispersed organic solvent for using the carbon nanotube in various applications such as polymer-based nanocomposites, and a method for producing the same.

BACKGROUND ART

Recently-discovered carbon nanotubes are tubular materials having diameters of 1 μm or less. In the carbon nanotubes, ideally a hexagonal carbon network forms a tubular structure parallel to the axis of the tube, which may be a multiple tubular structure. The carbon nanotubes are composed of carbon, have different properties depending on the number of the hexagonal network and thickness of the tube, and are expected as future mechanical functional materials.

Dispersion liquids containing a solvent and a carbon nanotube uniformly dispersed therein are useful for producing the mechanical functional materials using the carbon nanotubes. For example, a nanocomposite containing a carbon nanotube uniformly dispersed in a polymer matrix can be produced by dissolving a polymer in a liquid containing a solvent and the carbon nanotube uniformly dispersed therein. Further, the dispersion liquids containing a solvent and a carbon nanotube uniformly dispersed therein can be used in optical instruments for their low scattering properties. Furthermore, purified dispersion liquids can be used for producing electronic devices such as transistors, electron emitters, and secondary batteries. For example, an emitter using fine carbon particles can be formed by the steps of dispersing the fine carbon particles in a solvent to prepare a suspension, forming a pattern of the suspension on a support of a substrate using a printing method such as casting, screen printing, or ink-jet method, and drying the solvent to obtain a desired shape.

It is generally known that water-soluble solvents, organic solvents, and mixtures thereof can be used for dispersing the carbon nanotubes. For example, it is disclosed that water, acidic solutions, alkaline solutions, alcohols, ethers, petroleum ethers, benzene, ethyl acetate, chloroform, isopropyl alcohol, ethanol, acetone, toluene, etc. can be used as the solvent (see JP-A-2000-72422).

However, methods for sufficiently dispersing the carbon nanotubes in the solvents have not been established. This is because the carbon nanotubes are formed into a bundle or cord due to the cohesive forces (van der Waals forces) between the carbon nanotube molecules. Further, the carbon nanotubes have smooth surfaces at atomic level, and the smooth surfaces causes reduction of affinity for the solvent. Thus, though the carbon nanotubes have specific, useful properties, it is extremely difficult to produce polymer-based nanocomposites, etc. with the carbon nanotubes uniformly dispersed, and this makes practical use of the carbon nanotubes difficult.

Though various methods for improving the dispersibility of the carbon nanotubes in the solvents have been attempted, the methods are not necessarily effective.

A method of dispersing a carbon nanotube in acetone under ultrasonic irradiation has been proposed (see JP-A-2000-86219). However, though the carbon nanotube can be dispersed under the ultrasonic irradiation, the carbon nanotube molecules start to aggregate after the ultrasonic irradiation, and the molecules are entangled when the carbon nanotube concentration is high.

Use of surfactants has also been proposed. A method of using a nonionic surfactant TERGITOL (trademark) NP7 under ultrasonication has been proposed. However, it is reported that, when the amount of the carbon nanotube is increased in the method, the carbon nanotube is aggregated, failing to obtain a uniform dispersion (see S. Cui, et al., Carbon, 41, 2003, 797-809). Further, a method for dispersing a single-walled nanotube in an aqueous solution of an anionic surfactant SDS, which has the step of subjecting the nanotube to ultrasonication in the aqueous solution, thereby adsorbing a hydrophobic surface of the nanotube to a hydrophobic portion of the surfactant to form an outer hydrophilic portion, has also reported (see Michael J. O'Connel, et al., SCIENCE, Vol. 297, 26, July 2002, 593-596). However, a water-soluble solvent is used in the method, whereby there is a limit in the application of the method. For example, when the method is used for polymer-based nanocomposites, only water-soluble polymers can be used. Though a method of adsorbing a hydrophobic portion of a water-soluble polymer PVP to the carbon nanotube surface instead of the surfactant has been proposed, also the method uses the water-soluble polymer and thereby has application limitations (see Michael J. O'Connel, et al., Chemical Physics Letters, 13, July 2001, 264-271).

DISCLOSURE OF THE INVENTION

By dispersing a carbon nanotube in a solvent uniformly, the carbon nanotube can be used in various applications utilizing the specific properties. However, it is difficult to uniformly disperse the carbon nanotube in a solvent because of the cohesive forces between the carbon nanotube molecules and low affinity of the carbon nanotube surface. Particularly in the case of using the carbon nanotube for a polymer-based nanocomposite, etc., though dispersion of the carbon nanotube in a polar organic solvent, widely used as a solvent for a polymer, is remarkably useful, a method for effectively dispersing the carbon nanotube in such a polar organic solvent has not been established.

Accordingly, an object of the present invention is to provide a method for effectively dispersing a carbon nanotube in a polar organic solvent, useful as a solvent for polymers.

In the invention, a nonionic surfactant is noticed for a function as a dispersant for a carbon nanotube, and it is found that a mixture solution of an amide-based organic solvent and a polyvinylpyrrolidone (PVP) or of the amide-based organic solvent, the nonionic surfactant, and the polyvinylpyrrolidone (PVP) has an excellent function as a dispersant for the carbon nanotube, the carbon nanotube being not reaggregated in the solution even after a certain period.

Ultrasonication is necessary for dispersing the carbon nanotube. The ultrasonication may be carried out in the step of dispersing the carbon nanotube in the nonionic surfactant and the amide-based polar organic solvent, and then the polyvinylpyrrolidone (PVP) may be mixed therewith. Alternatively, a mixture solution of the nonionic surfactant, the amide-based polar organic solvent, and the polyvinylpyrrolidone (PVP) is prepared, and then the ultrasonication may be carried out in the step of dispersing the carbon nanotube therein.

The polyvinylpyrrolidone (PVP) is adsorbed to the carbon nanotube surface to enclose the carbon nanotube, thereby showing a so-called wrapping effect. Thus, it is considered that the polyvinylpyrrolidone has a function of preventing reaggregation of the carbon nanotube uniformly dispersed in the amide-based polar organic solvent and the nonionic surfactant.

Accordingly, there is provided a remarkably useful method for producing a polymer-based nanocomposite using the carbon nanotube, and further the method can be used for using the carbon nanotube in optical instruments utilizing reduced light scattering.

Specifically, the invention includes the following constitutes.

(1) A carbon nanotube dispersion liquid comprising a carbon nanotube, an amide-based polar organic solvent, and a polyvinylpyrrolidone (PVP).

(2) A carbon nanotube dispersion liquid comprising a carbon nanotube, an amide-based polar organic solvent, a nonionic surfactant, and a polyvinylpyrrolidone (PVP).

(3) The carbon nanotube dispersion liquid according to (1) or (2), characterized in that the amide-based polar organic solvent is N-methylpyrrolidone (NMP).

(4) The carbon nanotube dispersion liquid according to (2) or (3), characterized in that the nonionic surfactant is a polyoxyethylene surfactant.

(5) The carbon nanotube dispersion liquid according to any one of (2) to (4), characterized by having a nonionic surfactant content of 0.005 to 5%.

(6) The carbon nanotube dispersion liquid according to any one of (1) to (5), characterized by having a polyvinylpyrrolidone (PVP) content of 0.1 to 10%.

(7) The carbon nanotube dispersion liquid according to any one of (1) to (6), characterized in that the polyvinylpyrrolidone (PVP) has a molecular weight of 20,000 to 5,000,000.

(8) The carbon nanotube dispersion liquid according to any one of (1) to (7), characterized in that the carbon nanotube is a single-walled carbon nanotube (SWNT).

(9) The carbon nanotube dispersion liquid according to any one of (1) to (8), characterized by comprising as the carbon nanotube only fine carbon nanotube particles treated with a filter having a retaining particle size of 0.1 to 3.0 μm.

(10) The carbon nanotube dispersion liquid according to any one of (1) to (9), characterized in that the dispersion liquid is used for uniformly dispersing the carbon nanotube in a polymer-based nanocomposite.

(11) The carbon nanotube dispersion liquid according to any one of (1) to (10), characterized by having a reduced light scattering property.

(12) A method for producing a carbon nanotube dispersion liquid, characterized by comprising the step of dispersing a carbon nanotube in a mixture solution of an amide-based polar organic solvent and a polyvinylpyrrolidone (PVP) under ultrasonication.

(13) A method for producing a carbon nanotube dispersion liquid, characterized by comprising the steps of dispersing a carbon nanotube in a mixture solution of an amide-based polar organic solvent and a polyvinylpyrrolidone (PVP) under ultrasonication, and treating the resultant dispersion with a filter having a retaining particle size of 0.1 to 3.0 μm to obtain a dispersion liquid comprising fine carbon nanotube particles.

(14) A method for producing a carbon nanotube dispersion liquid, characterized by comprising the steps of dispersing a carbon nanotube in a mixture solution of an amide-based polar organic solvent and a nonionic surfactant under ultrasonication, and mixing the resultant dispersion with a polyvinylpyrrolidone (PVP).

(15) A method for producing a carbon nanotube dispersion liquid, characterized by comprising the steps of dispersing a carbon nanotube in a mixture solution of an amide-based polar organic solvent and a nonionic surfactant under ultrasonication, mixing the resultant dispersion with a polyvinylpyrrolidone (PVP), and treating the dispersion with a filter having a retaining particle size of 0.1 to 3.0 μm to obtain a dispersion liquid comprising fine carbon nanotube particles.

(16) A method for producing a carbon nanotube dispersion liquid, characterized by comprising the step of dispersing a carbon nanotube in a mixture solution of an amide-based polar organic solvent, a nonionic surfactant, and a polyvinylpyrrolidone (PVP) under ultrasonication.

(17) A method for producing a carbon nanotube dispersion liquid, characterized by comprising the steps of mixing a carbon nanotube with a mixture solution of an amide-based polar organic solvent, a nonionic surfactant, and a polyvinylpyrrolidone (PVP) under ultrasonication, and treating the resultant mixture with a filter having a retaining particle size of 0.1 to 3.0 μm to obtain a dispersion liquid comprising fine carbon nanotube particles.

The amide-based polar organic solvent used in the invention may be specifically dimethylformamide (DMF), diethylformamide, dimethylacetamide (DMAc), N-methylpyrrolidone (NMP), etc., and is particularly preferably N-methylpyrrolidone (NMP). Many organic substances (other than low hydrocarbons), inorganic substances, polar gases, and polymers, particularly polyamides, polyimides, polyesters, polyurethanes, and acrylic resins can be dissolved in these solvents. Thus, when the carbon nanotube can be uniformly dispersed in these solvents, a polymer-based nanocomposite, in which the carbon nanotube is uniformly dispersed, can be obtained by dissolving the polymer materials in the resultant dispersion liquid.

The nonionic surfactant used in the invention may have a polyoxyethylene-based structure, polyol fatty ester-based structure, or the both thereof, and is particularly preferably a polyoxyethylene surfactant. Examples of the polyoxyethylene surfactants include polyoxyethylene ethers of fatty acids, polyoxyethylene ethers of higher alcohols, alkylphenol polyoxyethylene ethers, polyoxyethylene ethers of sorbitan esters, polyoxyethylene ethers of castor oils, polyoxyethylene ethers of polyoxypropylenes, and fatty acid alkylol amides. Examples of the polyol fatty ester surfactants include monoglycerite surfactants, sorbitol surfactants, sorbitan surfactants, and sugar ester surfactants.

The nonionic surfactant content of the dispersion liquid may be appropriately determined depending on the carbon nanotube content and the type of the amide-based polar organic solvent, and generally a sufficient effect of dispersing the carbon nanotube can be achieved when the nonionic surfactant content is 0.005 to 10%. When the nonionic surfactant content is less than 0.005%, the ratio of the surfactant to the carbon nanotube is insufficient, so that part of the nanotube is aggregated to generate a precipitate. On the other hand, when the nonionic surfactant content is more than 10%, it is difficult to cause rotation of the surfactant molecules in the solvent, a sufficient amount of hydrophobic portion of the surfactant cannot be adsorbed to the hydrophobic nanotube surface, and this is disadvantageous in dispersion of fine nanotube. In addition, when the carbon nanotube content of the dispersion liquid is 0.005 to 0.05%, the nonionic surfactant content is preferably 0.01 to 5%.

The carbon nanotube used in the invention may be selected from ones having multilayer structures (multi-walled carbon nanotubes, called MWNT) and ones having single layer structures (single-walled carbon nanotubes, called SWNT) depending on the purposes. The single-walled carbon nanotubes are preferably used in the invention. The method for producing the SWNT is not particularly limited, and may be a known method such as a thermal decomposition method using a catalyst (similar to a vapor growth method), an arc discharge method, a laser vaporization method, or a HiPco method (High-pressure carbon monoxide method).

Production of the single-walled carbon nanotube, preferred in the invention, by a laser deposition method is described below. A mixture rod of a graphite powder and fine powders of nickel and cobalt were prepared as starting materials. This mixture rod was heated at 1,250° C. by an electric furnace under argon atmosphere at 665 hPa (500 Torr), and was irradiated with a second harmonic pulse of an Nd:YAG laser at 350 mJ/Pulse, thereby evaporating the carbon and the fine metal particles to produce the single-walled carbon nanotube.

The above production method is a typical example illustrative only, the types of the metals, type of the gas, temperature of the electric furnace, wavelength of the laser, etc. can be changed. Further, the single-walled nanotube may be produced by a method other than the laser deposition method, such as a HiPco method, CVD method, arc discharge method, thermal carbon monoxide decomposition method, template method having the steps of inserting organic molecules into fine pores and thermally decomposing the molecules, or fullerene metal codeposition method.

The carbon nanotube content of the dispersion liquid may be changed depending on the purposes, and is not particularly limited as long as the carbon nanotube has dispersibility. The SWNT can be dispersed by 0.05% at the maximum in a mixture solution of the NMP and the polyoxyethylene surfactant. The content is particularly preferably 0.005 to 0.05%.

In the invention, the ultrasonication may be carried out at under conditions of 20 kHz and 150 W, and 28 kHz and 140 W, for approximately 1 hour, to achieve an excellent dispersing effect, and the ultrasonication conditions are not limited thereto. The conditions may be appropriately determined depending on the amount of the carbon nanotube, type of the amide-based polar organic solvent, etc.

The polyvinylpyrrolidone (PVP) content of the dispersion liquid of the invention may be appropriately determined depending on the carbon nanotube content, and is preferably 0.1 to 10%. It is known that the polyvinylpyrrolidone is adsorbed to the carbon nanotube surface to enclose the carbon nanotube, thereby showing a so-called wrapping effect. In the invention, the wrapping effect of the polyvinylpyrrolidone is utilized for preventing reaggregation of the carbon nanotube uniformly dispersed in the amide-based polar organic solvent and the nonionic surfactant. Thus, by adding the polyvinylpyrrolidone, the carbon nanotube is prevented from reaggregating after a certain period, to improve the temporal change of the dispersion liquid. Therefore, when the amount ratio of the polyvinylpyrrolidone to the carbon nanotube is too low, the sufficient wrapping effect cannot be achieved, so that the nanotube is reaggregated.

The molecular weight of the polyvinylpyrrolidone (PVP) used in the invention is not particularly limited. Generally the sufficient reaggregation preventing effect can be achieved when the molecular weight is 20,000 to 5,000,000, and the molecular weight is preferably 200,000 to 2,000,000. When the molecular weight of the polyvinylpyrrolidone is smaller, the nanotube cannot sufficiently wrapped in the PVP because the nanotube has a remarkably large molecular weight. On the other hand, when the molecular weight of the polyvinylpyrrolidone is larger, the molecular motion of the PVP is reduced in the solvent, so that the nanotube cannot be sufficiently wrapped.

The filter used in the invention may be a glass fiber filter, a membrane filter, etc. The retaining particle size of the filter may be selected depending on the purposes. The retaining particle size is obtained from the particle size of barium sulfate, etc. passed through the filter in natural filtration in accordance with JIS 3801, and substantially corresponds to the average pore size of the filter. For example, in a case where the dispersion liquid is used for optical instruments utilizing the reduced light scattering, a smaller retaining particle size of the filter is more preferred. The retaining particle size may be generally 0.1 to 3.0 μm.

BEST MODE FOR CARRYING OUT THE INVENTION

The patents and other documents are expressly incorporated herein by reference in its entirety. Further, the present disclosure relates to subject matter contained in Japanese Patent Application Nos. 2003-397082 and 2003-403504, which is incorporated herein by reference in its entirety.

As described in following Examples, a polar organic solution with an excellent property of dispersing a carbon nanotube can be obtained by the steps of dispersing 0.005 to 0.05% of a single-walled carbon nanotube in an NMP solvent added with 0.01 to 5% of a polyoxyethylene surfactant under ultrasonic irradiation, and then mixing 0.1 to 10% of a polyvinylpyrrolidone therewith, or by irradiating the dispersion with ultrasonic wave after the mixing of the polypyrrolidone.

Example 1

1 mg of an SWNT prepared by a HiPco process (high-pressure carbon monoxide process) was dissolved in a solution containing 10 g of an NMP (N-methylpyrrolidone) solvent and 100 mg of a polyvinylpyrrolidone (PVP) powder having an average molecular weight of 1,300,000, treated with an ultrasonic wave at 20 kHz for 1 hour, stirred, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 μm and a membrane filter FR-100 having a pore size of 1 μm. As a result of evaluating the resultant filtrates with respect to color, the filtrates were both black. These liquids were stable and the carbon nanotubes therein were not aggregated and deposited even after 30 days.

Example 2

The processes of Example 1 were carried out under a condition of a different PVP content. 1 mg of an SWNT prepared by a HiPco process (high-pressure carbon monoxide process) was added to and dissolved in 10 g of an NMP (N-methylpyrrolidone) solvent and 50 mg of a polyvinylpyrrolidone (PVP) powder having an average molecular weight of 1,300,000, treated with an ultrasonic wave at 20 kHz for 1 hour, stirred, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 μm and a membrane filter FR-100 having a pore size of 1 μm. As a result of evaluating the resultant filtrates with respect to color, the filtrates were both black. These liquids were stable and the carbon nanotubes therein were not aggregated and deposited even after 30 days.

Example 3

The processes of Example 1 were carried out under a condition of a different PVP molecular weight. 1 mg of an SWNT prepared by a HiPco process (high-pressure carbon monoxide process) was added to and dissolved in 10 g of an NMP (N-methylpyrrolidone) solvent and 100 mg of a polyvinylpyrrolidone (PVP) powder having an average molecular weight of 35,000, treated with an ultrasonic wave at 20 kHz for 1 hour, stirred, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 μm and a membrane filter FR-100 having a pore size of 1 μm. As a result of evaluating the resultant filtrates with respect to color, the filtrates both had black colors, which were lighter than those of Example 1. These liquids were stable and the carbon nanotubes therein were not aggregated and deposited even after 30 days.

Example 4

The processes of Example 1 were carried out using a carbon nanotube prepared by a laser deposition method. 1 mg of an SWNT prepared by a laser deposition method was added to and dissolved in 10 g of an NMP (N-methylpyrrolidone) solvent and 100 mg of a polyvinylpyrrolidone (PVP) powder having an average molecular weight of 1,300,000, treated with an ultrasonic wave at 20 kHz for 1 hour, stirred, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 μm and a membrane filter FR-100 having a pore size of 1 μm. As a result of evaluating the resultant filtrates with respect to color, the filtrates were both black. These liquids were stable and the carbon nanotubes therein were not aggregated and deposited even after 30 days.

Example 5

1 mg of an SWNT prepared by a HiPco process (high-pressure carbon monoxide process) was added to and mixed with a mixture solution containing 10 g of an NMP (N-methylpyrrolidone) solvent and 10 mg of a polyoxyethylene surfactant TRITON (trademark) X-100, and treated with an ultrasonic wave at 20 kHz for 1 hour. 100 mg of a polyvinylpyrrolidone (PVP) powder having an average molecular weight of 360,000 was added to and dissolved in the resultant mixture, stirred, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 μm and a membrane filter FR-100 having a pore size of 1 μm. As a result of evaluating the resultant filtrates with respect to color, the filtrates were both black. These liquids were stable and the carbon nanotubes therein were not aggregated and deposited even after 30 days.

Example 6

The processes of Example 5 were carried out under a condition of a different PVP content. 1 mg of an SWNT prepared by a HiPco process (high-pressure carbon monoxide process) was added to and mixed with a mixture solution containing 10 g of an NMP (N-methylpyrrolidone) solvent and 10 mg of a polyoxyethylene surfactant TRITON (trademark) X-100, and treated with an ultrasonic wave at 20 kHz for 1 hour. 50 mg of a polyvinylpyrrolidone (PVP) powder having an average molecular weight of 360,000 was added to and dissolved in the resultant mixture, stirred, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 μm and a membrane filter FR-100 having a pore size of 1 μm. As a result of evaluating the resultant filtrates with respect to color, the filtrates were both black. These liquids were stable and the carbon nanotubes therein were not aggregated and deposited even after 30 days.

Example 7

The processes of Example 5 were carried out under a condition of a different PVP molecular weight. 1 mg of an SWNT prepared by a HiPco process (high-pressure carbon monoxide process) was added to and mixed with a mixture solution containing 10 g of an NMP (N-methylpyrrolidone) solvent and 10 mg of a polyoxyethylene surfactant TRITON (trademark) X-100, and treated with an ultrasonic wave at 20 kHz for 1 hour. 100 mg of a polyvinylpyrrolidone (PVP) powder having an average molecular weight of 35,000 was added to and dissolved in the resultant mixture, stirred, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 μm and a membrane filter FR-100 having a pore size of 1 μm. As a result of evaluating the resultant filtrates with respect to color, the filtrates both had black colors, which were lighter than those of Example 1. These liquids were stable and the carbon nanotubes therein were not aggregated and deposited even after 30 days.

Example 8

The processes of Example 5 were carried out using a carbon nanotube prepared by a laser deposition method. 1 mg of an SWNT prepared by a laser deposition method was added to and mixed with a mixture solution containing 10 g of an NMP (N-methylpyrrolidone) solvent and 10 mg of a polyoxyethylene surfactant TRITON (trademark) X-100, and treated with an ultrasonic wave at 20 kHz for 1 hour. 100 mg of a polyvinylpyrrolidone (PVP) powder having an average molecular weight of 360,000 was added to and dissolved in the resultant mixture, stirred, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 μm and a membrane filter FR-100 having a pore size of 1 μm. As a result of evaluating the resultant filtrates with respect to color, the filtrates were both black. These liquids were stable and the carbon nanotubes therein were not aggregated and deposited even after 30 days.

Example 9

1 mg of an SWNT prepared by a HiPco process (high-pressure carbon monoxide process) was mixed with 10 g of an NMP (N-methylpyrrolidone) solvent, 10 mg of a polyoxyethylene surfactant TRITON (trademark) X-100, and 100 mg of a polyvinylpyrrolidone (PVP) powder having an average molecular weight of 360,000. The resultant mixture was treated with an ultrasonic wave at 20 kHz for 1 hour, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 µm and a membrane filter FR-100 having a pore size of 1 µm. As a result of evaluating the resultant filtrates with respect to color, the filtrates were both black. These liquids were stable and the carbon nanotubes therein were not aggregated and deposited even after 30 days.

Example 10

The processes of Example 9 were carried out under a condition of a different PVP content. 1 mg of an SWNT prepared by a HiPco process (high-pressure carbon monoxide process) was mixed with 10 g of an NMP (N-methylpyrrolidone) solvent, 10 mg of a polyoxyethylene surfactant TRITON (trademark) X-100, and 50 mg of a polyvinylpyrrolidone (PVP) powder having an average molecular weight of 360,000. The resultant mixture was treated with an ultrasonic wave at 20 kHz for 1 hour, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 µm and a membrane filter FR-100 having a pore size of 1 µm. As a result of evaluating the resultant filtrates with respect to color, the filtrates were both black. These liquids were stable and the carbon nanotubes therein were not aggregated and deposited even after 30 days.

Example 11

The processes of Example 9 were carried out under a condition of a different PVP molecular weight. 1 mg of an SWNT prepared by a HiPco process (high-pressure carbon monoxide process) was mixed with 10 g of an NMP (N-methylpyrrolidone) solvent, 10 mg of a polyoxyethylene surfactant TRITON (trademark) X-100, and 100 mg of a polyvinylpyrrolidone (PVP) powder having an average molecular weight of 35,000. The resultant mixture was treated with an ultrasonic wave at 20 kHz for 1 hour, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 µm and a membrane filter FR-100 having a pore size of 1 µm. As a result of evaluating the resultant filtrates with respect to color, the filtrates were both black. These liquids were stable and the carbon nanotubes therein were not aggregated and deposited even after 30 days.

Example 12

The processes of Example 9 were carried out using a carbon nanotube prepared by a laser deposition method. 1 mg of an SWNT prepared by a laser deposition method was mixed with 10 g of an NMP (N-methylpyrrolidone) solvent, 10 mg of a polyoxyethylene surfactant TRITON (trademark) X-100, and 100 mg of a polyvinylpyrrolidone (PVP) powder having an average molecular weight of 360,000. The resultant mixture was treated with an ultrasonic wave at 20 kHz for 1 hour, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 µm and a membrane filter FR-100 having a pore size of 1 µm. As a result of evaluating the resultant filtrates with respect to color, the filtrates were both black. These liquids were stable and the carbon nanotubes therein were not aggregated and deposited even after 30 days.

Example 13

The processes of Example 5 were carried out using a different surfactant. 1 mg of an SWNT prepared by a HiPco process (high-pressure carbon monoxide process) was added to and mixed with a mixture solution containing 10 g of an NMP (N-methylpyrrolidone) solvent and 10 mg of a polyoxyethylene surfactant IGEPAL (trademark) CA210, and treated with an ultrasonic wave at 20 kHz for 1 hour. 100 mg of a polyvinylpyrrolidone (PVP) powder having an average molecular weight of 360,000 was added to and dissolved in the resultant mixture, stirred, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 µm and a membrane filter FR-100 having a pore size of 1 µm. As a result of evaluating the resultant filtrates with respect to color, the filtrates were both black. These liquids were stable and the carbon nanotubes therein were not aggregated and deposited even after 30 days.

Example 14

The processes of Example 5 were carried out using a different surfactant. 1 mg of an SWNT prepared by a HiPco process (high-pressure carbon monoxide process) was added to and mixed with a mixture solution containing 10 g of an NMP (N-methylpyrrolidone) solvent and 10 mg of a polyoxyethylene surfactant TWEEN (trademark) 60, and treated with an ultrasonic wave at 20 kHz for 1 hour. 100 mg of a polyvinylpyrrolidone (PVP) powder having an average molecular weight of 360,000 was added to and dissolved in the resultant mixture, stirred, and aged at 50° C. for 12 hours, to obtain a black suspension free of precipitates. Then the obtained carbon nanotube dispersion liquid was divided into two, and filtered with a glass fiber filter paper GC-50 having a retaining particle size of 0.5 µm and a membrane filter FR-100 having a pore size of 1 µm. As a result of evaluating the resultant filtrates with respect to color, the filtrates were both black. These liquids were stable and the carbon nanotubes therein were not aggregated and deposited even after 30 days.

Example 15

Each of the carbon nanotube dispersion liquids produced in Examples 1 to 14 was mixed with an NMP solution of a block-copolymerized polyimide, and was formed into a thin film by a doctor blade. As a result of observing each thin film using an optical microscope, aggregation of the nanotube was not found. Further, as a result of measuring the microscopic Raman spectra and visible/near-infrared absorption spectra of each thin film, Raman signals and absorption of the nanotube were detected. Thus, it was confirmed that, by using the carbon nanotube dispersion liquid of the invention, the SWNT could be uniformly dispersed in a polymer.

Example 16

The light scattering property of each carbon nanotube dispersion liquid produced in Examples 1 to 14 was obtained by a dynamic light scattering measuring apparatus. As a result, it was confirmed that each dispersion liquid had a remarkably low light scattering property.

Comparative Example 1

The processes of Example 1 were carried out without using the PVP. 1 mg of an SWNT prepared by a HiPco process (high-pressure carbon monoxide process) was added to and mixed with a mixture solution containing 10 g of an NMP (N-methylpyrrolidone) solvent and 10 mg of a polyoxyethylene surfactant TRITON (trademark) X-100, and treated with an ultrasonic wave at 20 kHz for 1 hour, to obtain a black suspension free of precipitates. Then the obtained carbon nanotube dispersion liquid was divided into two, and filtered with a glass fiber filter paper GA-100 having a retaining particle size of 1.0 μm and a glass fiber filter paper GC-50 having a retaining particle size of 0.5 μm. As a result of evaluating the resultant filtrates with respect to color, the filtrates were both black. In these liquids, the carbon nanotubes were partly aggregated after 1 week.

Comparative Example 2

The processes of Example 5 were carried out without using the PVP. 1 mg of an SWNT prepared by a HiPco process (high-pressure carbon monoxide process) was added to and mixed with 10 g of an NMP (N-methylpyrrolidone) solvent, and treated with an ultrasonic wave at 20 kHz for 1 hour, to obtain a black suspension. Then the obtained black carbon nanotube dispersion liquid was divided into two, and filtered with a glass fiber filter paper GA-100 having a retaining particle size of 1.0 μm and a glass fiber filter paper GC-50 having a retaining particle size of 0.5 μm. As a result of evaluating the resultant filtrates with respect to color, the filtrates were both clear. In these liquids, the carbon nanotubes were aggregated and did not pass through the filter papers.

INDUSTRIAL APPLICABILITY

According to the present invention, there is provided the polar organic solvent in which the carbon nanotube is uniformly dispersed. Thus, the invention allows use of the carbon nanotube material in various applications such as production of polymer-based nanocomposites using the carbon nanotube, application to optical instruments utilizing reduced light scattering, and production of electron emitters.

The invention claimed is:

1. A non-aqueous carbon nanotube dispersion liquid consisting of a carbon nanotube, an amide-based polar organic solvent, and a polyvinylpyrrolidone (PVP).

2. A non-aqueous carbon nanotube dispersion liquid consisting of a carbon nanotube, an amide-based polar organic solvent, a nonionic surfactant, and a polyvinylpyrrolidone (PVP).

3. The non-aqueous carbon nanotube dispersion liquid according to claim 1, characterized in that the amide-based polar organic solvent is N-methylpyrrolidone (NMP).

4. The non-aqueous carbon nanotube dispersion liquid according to claim 2, characterized in that the nonionic surfactant is a polyoxyethylene surfactant.

5. The non-aqueous carbon nanotube dispersion liquid according to claim 1, characterized by having a nonionic surfactant content of 0.005 to 5%.

6. The non-aqueous nanotube dispersion liquid according to claim 1, characterized by having a polyvinylpyrrolidone (PVP) content of 0.1 to 10%.

7. The non-aqueous carbon nanotube dispersion liquid according to claim 1, characterized in that the polyvinylpyrrolidone (PVP) has a molecular weight of 20,000 to 5,000,000.

8. The non-aqueous carbon nanotube dispersion liquid according to claim 1, characterized in that the carbon nanotube is a single-walled carbon nanotube (SWNT).

9. The non-aqueous carbon nanotube dispersion liquid according to claim 1, characterized by comprising as the carbon nanotube only fine carbon nanotube particles treated with a filter having a retaining particle size of 0.1 to 3.0 μm.

10. The non-aqueous carbon nanotube dispersion liquid according to claim 1, characterized in that the dispersion liquid is used for uniformly dispersing the carbon nanotube in a polymer-based nanocomposite.

11. The non-aqueous carbon nanotube dispersion liquid according to claim 1, characterized by having a reduced light scattering property.

12. A method for producing a non-aqueous carbon nanotube dispersion liquid, comprising the step of mixing and dispersing a carbon nanotube in a mixture solution of an amide-based polar organic solvent and a polyvinylpyrrolidone (PVP) under ultrasonication.

13. The method for producing a non-aqueous carbon nanotube dispersion liquid according to claim 12, further comprising the step of treating the resultant dispersion with a filter having a retaining particle size of 0.1 to 3.0 μm to obtain a dispersion liquid comprising only fine carbon nanotube particles.

14. A method for producing a non-aqueous carbon nanotube dispersion, comprising the steps of mixing and dispersing a carbon nanotube in a mixture solution of an amide-based polar organic solvent and a nonionic surfactant under ultrasonication, and mixing the resultant dispersion with a polyvinylpyrrolidone (PVP).

15. The method for producing a non-aqueous carbon nanotube dispersion liquid according to claim 14, further comprising the step of mixing the resultant dispersion with a polyvinylpyrrolidone (PVP), and treating the dispersion with a filter having a retaining particle size of 0.1 to 3.0 μm to obtain a dispersion liquid comprising fine carbon nanotube particles.

16. The method for producing a non-aqueous carbon nanotube dispersion liquid according to claim 14, where in the step of mixing and dispersing a polyvinylpyrrolidone (PVP) is added.

17. The method for producing a non-aqueous carbon nanotube dispersion liquid according to claim 16, further comprising the step of treating the resultant mixture with a filter having a retaining particle size of 0.1 to 3.0 μm to obtain a dispersion liquid comprising fine carbon nanotube particles.

18. The non-aqueous carbon nanotube dispersion liquid according to claim 2, characterized in that the amide-based polar organic solvent is N-methylpyrrolidone (NMP).

19. The non-aqueous carbon nanotube dispersion liquid according to claim 3, characterized in that the nonionic surfactant is a polyoxyethylene surfactant.

* * * * *